United States Patent
Kumar et al.

(10) Patent No.: US 12,538,219 B2
(45) Date of Patent: Jan. 27, 2026

(54) METHOD AND DEVICE FOR QUICK SWITCH FROM DISASTER ROAMING SERVICE TO NORMAL SERVICE

(71) Applicant: Samsung Electronics Co., Ltd., Suwon-si (KR)

(72) Inventors: Lalith Kumar, Bangalore (IN); Aman Agarwal, Bangalore (IN); Kailash Kumar Jha, Bangalore (IN); Mahmoud Watfa, Bangalore (IN)

(73) Assignee: Samsung Electronics Co., Ltd., Suwon-si (KR)

( * ) Notice: Subject to any disclaimer, the term of this patent is extended or adjusted under 35 U.S.C. 154(b) by 473 days.

(21) Appl. No.: 18/015,865

(22) PCT Filed: Jan. 4, 2023

(86) PCT No.: PCT/KR2023/000129
§ 371 (c)(1),
(2) Date: Jan. 12, 2023

(87) PCT Pub. No.: WO2023/132613
PCT Pub. Date: Jul. 13, 2023

(65) Prior Publication Data
US 2024/0251339 A1    Jul. 25, 2024

(30) Foreign Application Priority Data

Jan. 4, 2022  (IN) .............................. 202141061167
Dec. 19, 2022  (IN) .............................. 2021 41061167

(51) Int. Cl.
*H04W 48/18* (2009.01)
*H04W 8/02* (2009.01)
*H04W 84/04* (2009.01)

(52) U.S. Cl.
CPC ............. *H04W 48/18* (2013.01); *H04W 8/02* (2013.01); *H04W 84/042* (2013.01)

(58) Field of Classification Search
CPC ............... H04W 48/18; H04W 84/042; H04W 60/04; H04W 4/90; H04W 8/02; H04W 48/16;
(Continued)

(56) References Cited

U.S. PATENT DOCUMENTS

2010/0261474 A1  10/2010  Gollapudi et al.
2017/0230847 A1  8/2017  Aminaka
(Continued)

FOREIGN PATENT DOCUMENTS

| EP | 3905737 A1 | 11/2021 |
| WO | 2019/122494 A1 | 6/2019 |
| WO | 2021/007447 A1 | 1/2021 |

OTHER PUBLICATIONS

3GPP; TSG CT; NAS functions related to MS in idle mode (Release 17)', 3GPP TS 23.122 V17.4.0, Sep. 24, 2021.
(Continued)

*Primary Examiner* — Marcus Hammonds
(74) *Attorney, Agent, or Firm* — Jefferson IP Law, LLP (57) ABSTRACT

The disclosure relates to a 5G or 6G communication system for supporting a higher data transmission rate. Embodiments herein provide higher priority PLMN selection method during disaster situation in a wireless network (1000) by MS (100). In an embodiment, when MS (100) is registered for the disaster roaming service, the method includes selecting a higher priority PLMN in a priority order when the higher priority PLMN is available in the network and other non-forbidden PLMN when the higher priority PLMN is unavailable in the network, and registering the MS to receive the service in the network on one of the selected higher priority PLMN, and the selected other non-forbidden PLMN. In another embodiment, when the MS is not registered for the disaster roaming service, the method includes selecting a higher priority PLMN in a priority order when the higher priority PLMN is available in network, and registering the MS on the selected higher priority PLMN to receive the service in network.

6 Claims, 4 Drawing Sheets

(58) Field of Classification Search
CPC ....... H04W 8/12; H04W 60/00; H04W 48/02; H04W 76/50; H04W 12/40; H04W 12/088
See application file for complete search history.

(56) References Cited

U.S. PATENT DOCUMENTS

| | | | |
|---|---|---|---|
| 2022/0070814 A1* | 3/2022 | Chun | H04W 8/02 |
| 2022/0070815 A1* | 3/2022 | Chun | H04W 48/16 |
| 2022/0225214 A1* | 7/2022 | Vamanan | H04W 4/90 |
| 2022/0264275 A1* | 8/2022 | Vamanan | H04W 4/90 |
| 2023/0276342 A1* | 8/2023 | Park | H04W 48/16 370/329 |
| 2023/0371126 A1* | 11/2023 | Park | H04W 48/16 |

OTHER PUBLICATIONS

International Search Report dated Mar. 30, 2023, issued in International Patent Application No. PCT/KR2023/000129.
3GPP TS 23.122 V17.7.0 (Jun. 2022) 3rd Generation Partnership Project; Technical Specification Group Core Network and Terminals; Non-Access-Stratum (NAS) functions related to Mobile Station (MS) in idle mode (Release 17).
Indian Office Action dated Dec. 11, 2023, issued in Indian Patent Application No. 202141061167.

* cited by examiner

METHOD AND DEVICE FOR QUICK SWITCH FROM DISASTER ROAMING SERVICE TO NORMAL SERVICE

TECHNICAL FIELD

The present disclosure relates to a wireless network, and more particularly related to a method and a User Equipment (UE) to perform higher priority Public Land Mobile Network (PLMN) Selection during a Minimization of Service Interruption (MINT) situation in the wireless network.

BACKGROUND ART 5G mobile communication technologies define broad frequency bands such that high transmission rates and new services are possible, and can be implemented not only in "Sub 6 GHz" bands such as 3.5 GHz, but also in "Above 6 GHz" bands referred to as mmWave including 28 GHz and 39 GHz. In addition, it has been considered to implement 6G mobile communication technologies (referred to as Beyond 5G systems) in terahertz bands (for example, 95 GHz to 3THz bands) in order to accomplish transmission rates fifty times faster than 5G mobile communication technologies and ultra-low latencies one-tenth of 5G mobile communication technologies.

At the beginning of the development of 5G mobile communication technologies, in order to support services and to satisfy performance requirements in connection with enhanced Mobile BroadBand (eMBB), Ultra Reliable Low Latency Communications (URLLC), and massive Machine-Type Communications (mMTC), there has been ongoing standardization regarding beamforming and massive MIMO for mitigating radio-wave path loss and increasing radio-wave transmission distances in mmWave, supporting numerologies (for example, operating multiple subcarrier spacings) for efficiently utilizing mmWave resources and dynamic operation of slot formats, initial access technologies for supporting multi-beam transmission and broadbands, definition and operation of BWP (BandWidth Part), new channel coding methods such as a LDPC (Low Density Parity Check) code for large amount of data transmission and a polar code for highly reliable transmission of control information, L2 pre-processing, and network slicing for providing a dedicated network specialized to a specific service.

Currently, there are ongoing discussions regarding improvement and performance enhancement of initial 5G mobile communication technologies in view of services to be supported by 5G mobile communication technologies, and there has been physical layer standardization regarding technologies such as V2X (Vehicle-to-everything) for aiding driving determination by autonomous vehicles based on information regarding positions and states of vehicles transmitted by the vehicles and for enhancing user convenience, NR-U (New Radio Unlicensed) aimed at system operations conforming to various regulation-related requirements in unlicensed bands, NR UE Power Saving, Non-Terrestrial Network (NTN) which is UE-satellite direct communication for providing coverage in an area in which communication with terrestrial networks is unavailable, and positioning.

Moreover, there has been ongoing standardization in air interface architecture/protocol regarding technologies such as Industrial Internet of Things (IIoT) for supporting new services through interworking and convergence with other industries, IAB (Integrated Access and Backhaul) for providing a node for network service area expansion by supporting a wireless backhaul link and an access link in an integrated manner, mobility enhancement including conditional handover and DAPS (Dual Active Protocol Stack) handover, and two-step random access for simplifying random access procedures (2-step RACH for NR). There also has been ongoing standardization in system architecture/service regarding a 5G baseline architecture (for example, service based architecture or service based interface) for combining Network Functions Virtualization (NFV) and Software-Defined Networking (SDN) technologies, and Mobile Edge Computing (MEC) for receiving services based on UE positions.

As 5G mobile communication systems are commercialized, connected devices that have been exponentially increasing will be connected to communication networks, and it is accordingly expected that enhanced functions and performances of 5G mobile communication systems and integrated operations of connected devices will be necessary. To this end, new research is scheduled in connection with eXtended Reality (XR) for efficiently supporting AR (Augmented Reality), VR (Virtual Reality), MR (Mixed Reality) and the like, 5G performance improvement and complexity reduction by utilizing Artificial Intelligence (AI) and Machine Learning (ML), AI service support, metaverse service support, and drone communication.

Furthermore, such development of 5G mobile communication systems will serve as a basis for developing not only new waveforms for providing coverage in terahertz bands of 6G mobile communication technologies, multi-antenna transmission technologies such as Full Dimensional MIMO (FD-MIMO), array antennas and large-scale antennas, metamaterial-based lenses and antennas for improving coverage of terahertz band signals, high-dimensional space multiplexing technology using OAM (Orbital Angular Momentum), and RIS (Reconfigurable Intelligent Surface), but also full-duplex technology for increasing frequency efficiency of 6G mobile communication technologies and improving system networks, AI-based communication technology for implementing system optimization by utilizing satellites and AI (Artificial Intelligence) from the design stage and internalizing end-to-end AI support functions, and next-generation distributed computing technology for implementing services at levels of complexity exceeding the limit of UE operation capability by utilizing ultrahigh-performance communication and computing resources.

The purpose of a Minimization of Service Interruption (MINT) is to minimize interruption of service to a user, when a wireless network to which the users are subscribed cannot provide service due to a disaster such as e.g. a fire, by enabling the users to obtain service on other networks, while at the same time protecting those other networks from congestion.

DISCLOSURE OF INVENTION

Technical Problem

The principal object of the embodiments herein is to provide a method and UE to perform higher priority Public Land Mobile Network (PLMN) Selection during Minimization of Service Interruption (MINT) situation in the wireless network.

Solution to Problem

Accordingly, the embodiment herein is to provide a higher priority PLMN selection method during a disaster situation in a wireless network. The method includes detecting, by a mobile station (MS) in the wireless network, whether the MS is registered for a disaster roaming service. In an embodiment, when the MS is registered for the disaster roaming service, the method includes selecting a higher priority PLMN in a priority order when the higher priority PLMN is available in the wireless network, other non-forbidden PLMN when the higher priority PLMN is unavailable in the wireless network, and registering the MS to receive the service (e.g. normal service, emergency services) in the wireless network on one of the selected higher priority PLMN, and the selected other non-forbidden PLMN. In another embodiment, when the MS is not registered for the disaster roaming service, the method includes selecting a higher priority PLMN in a priority order when the higher priority PLMN is available in the wireless network, and registering the MS on the selected higher priority PLMN to receive the service in the wireless network.

In an embodiment, the higher priority PLMN in the priority order includes i) select one of a HPLMN when an EHPLMN list is not present or is empty, and a highest priority EHPLMN that is available when the EHPLMN list is present, ii) each PLMN/access technology combination in an "User Controlled PLMN Selector with Access Technology" data file in a SIM in the priority order, and iii) each PLMN/access technology combination in an "Operator Controlled PLMN Selector with Access Technology" data file in a SIM in the priority order or stored in a ME in the priority order.

In an embodiment, the other non-forbidden PLMN includes i) other PLMN/access technology combinations with received high quality signal in a random order, and ii) other PLMN/access technology combinations in an order of decreasing signal quality.

In an embodiment, when the MS is registered for the disaster roaming service on the forbidden PLMN, the method includes initiating, by the MS, a predefined timer T based on a timer value stored in a SIM or ME of the MS. Further, the method includes determining, by the MS, whether a predefined timer is expired. Further, the method includes periodically attempt, by the MS, to obtain the service on the allowable PLMN when the predefined timer T is expired by triggering the higher priority PLMN selection method.

In an embodiment, periodically attempt, by the MS, to obtain the service on the allowable PLMN includes scanning, by the MS, for a plurality of PLMNs in the wireless network when the predefined timer is expired, determining, by the MS, whether one of at least one higher priority PLMN and at least one other non-forbidden PLMN is available in the plurality of PLMNs based on the scanning, and performing, by the MS, one of when the at least one higher priority PLMN is available in the plurality of PLMNs based on the scanning, selecting the higher priority PLMN from the at least one higher priority PLMN in the plurality of PLMNs in the priority order, and registering the MS on the selected higher priority PLMN to receive the service, and when the at least one other non-forbidden PLMN is available in the plurality of PLMNs based on the scanning, selecting the other non-forbidden PLMN from the at least one other non-forbidden PLMN in the plurality of PLMNs in the priority order, and registering the MS on the selected PLMN to receive the service.

In an embodiment, one of the selected higher priority PLMN, and the selected other non-forbidden PLMN is of same country as that of current serving PLMN before registering on the one of the selected higher priority PLMN, and the selected other non-forbidden PLMN.

In an embodiment, the method includes determining, by the MS, that one of the higher priority PLMN and the other non-forbidden PLMN is not available in the wireless network when the MS is registered for the disaster roaming service. Further, the method includes maintaining, by the MS, registration of the MS with the current registered PLMN.

Accordingly, the embodiment herein is to provide a MS for PLMN selection during disaster situation in a wireless network. The MS includes a PLMN selection controller communicatively coupled to a memory and a processor. The PLMN selection controller is configured to detect that the MS is registered for a disaster roaming service. In an embodiment, when the MS is registered for the disaster roaming service, the PLMN selection controller is configured to select a higher priority PLMN in a priority order when the higher priority PLMN is available in the wireless network, other non-forbidden PLMN when the higher priority PLMN is unavailable in the wireless network, and register the MS to receive the service in the wireless network on one of the selected higher priority PLMN, and the selected other non-forbidden PLMN. In another embodiment, when the MS is not registered for the disaster roaming service, the PLMN selection controller is configured to select a higher priority PLMN in a priority order when the higher priority PLMN is available in the wireless network, and register the MS on the selected higher priority PLMN to receive the service (e.g. normal service) in the wireless network.

These and other aspects of the embodiments herein will be better appreciated and understood when considered in conjunction with the following description and the accompanying drawings. It should be understood, however, that the following descriptions, while indicating preferred embodiments and numerous specific details thereof, are given by way of illustration and not of limitation. Many changes and modifications may be made within the scope of the embodiments herein without departing from the scope thereof, and the embodiments herein include all such modifications.

Advantageous Effects of Invention

The embodiments of the disclosure may provide a method and device to perform higher priority PLMN Selection during MINT situation in the wireless network.

BRIEF DESCRIPTION OF DRAWINGS

The method and the UE are illustrated in the accompanying drawings, throughout which like reference letters indicate corresponding parts in the various figures. The embodiments herein will be better understood from the following description with reference to the drawings, in which.

MODE FOR THE INVENTION

The embodiments herein and the various features and advantageous details thereof are explained more fully with reference to the non-limiting embodiments that are illustrated in the accompanying drawings and detailed in the following description. Descriptions of well-known components and processing techniques are omitted so as to not unnecessarily obscure the embodiments herein. Also, the various embodiments described herein are not necessarily mutually exclusive, as some embodiments can be combined with one or more other embodiments to form new embodiments. The term "or" as used herein, refers to a non-exclusive or, unless otherwise indicated. The examples used herein are intended merely to facilitate an understanding of ways in which the embodiments herein can be practiced and to further enable those skilled in the art to practice the embodiments herein. Accordingly, the examples should not be construed as limiting the scope of the embodiments herein.

As is traditional in the field, embodiments may be described and illustrated in terms of blocks which carry out a described function or functions. These blocks, which may be referred to herein as managers, units, modules, hardware components or the like, are implemented by analog and/or digital circuits such as logic gates, integrated circuits, microprocessors, microcontrollers, memory circuits, passive electronic components, active electronic components, optical components, hardwired circuits and the like, and may optionally be driven by firmware and software. The circuits may, for example, be embodied in one or more semiconductor chips, or on substrate supports such as printed circuit boards and the like. The circuits constituting a block may be implemented by dedicated hardware, or by a processor (e.g., one or more programmed microprocessors and associated circuitry), or by a combination of dedicated hardware to perform some functions of the block and a processor to perform other functions of the block. Each block of the embodiments may be physically separated into two or more interacting and discrete blocks without departing from the scope of the disclosure. Likewise, the blocks of the embodiments may be physically combined into more complex blocks without departing from the scope of the disclosure.

In the description, Public Land Mobile Network (PLMN) 'D') is subject to disaster and PLMN 'A' is alive and not subject to disaster.

Figure 1:
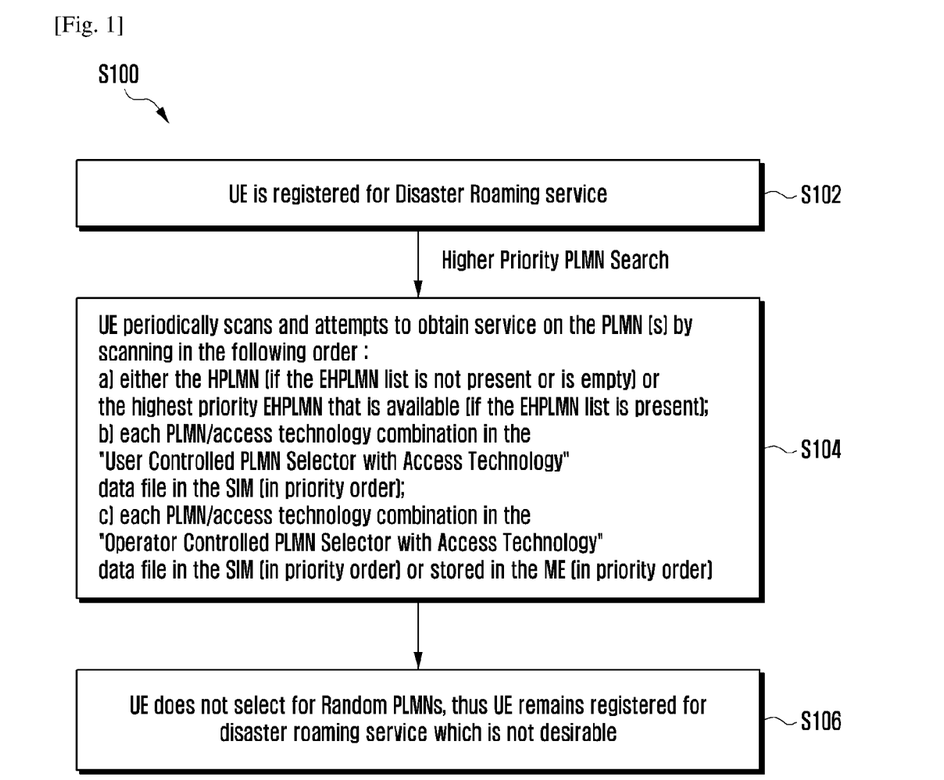
FIG. 1 is a flow chart illustrating an example scenario of PLMN(s) which a UE scan and obtain service when the UE is registered for a disaster roaming service, according to the prior arts.

FIG. 1 is a flow chart illustrates an example scenario (S100) of PLMN(s) which a UE scan and obtain service when the UE is registered for disaster roaming service, according to the prior arts. Referring to the FIG. 1, considering the conventional methods and systems illustrate the following operations.

The UE is registered on a Forbidden Public Land Mobile Network (FPLMN) list (consider "FP1") to receive the disaster roaming service. But, the UE will not select Random PLMNs. Thus the UE will be not be able to receive normal services and continue to receive disaster roaming services which are not desirable. The Random PLMNs are not configure in the UE as part of HPLMN or EHPLMN list or UPLMN or OPLMN list and is/are a combination of a) Other PLMN/access technology combinations with received high quality signal in random order; and
b) Other PLMN/access technology combinations in order of decreasing signal quality.

The conventional methods does not have PLMN(s) shall UE scan and obtain service when the UE is registered for Disaster Roaming Service. The method is given in steps as follows:

At S102, the UE is registered for the Disaster Roaming service. The Higher Priority PLMN Search is provided to the next step.

At S104, the UE periodically scans and attempts to obtain service on the PLMN(s) by scanning in the following order:
  a. either the HPLMN (if the EHPLMN list is not present or is empty) or the highest priority EHPLMN that is available (if the EHPLMN list is present);
  b. each PLMN/access technology combination in the "User Controlled PLMN Selector with Access Technology" data file in the SIM (in priority order) (UPLMN list);
  c. each PLMN/access technology combination in the "Operator Controlled PLMN Selector with Access Technology" data file in the SIM (in priority order) or stored in the ME (in priority order) (OPLMN list);

At S106, the UE does not select for Random PLMNs, thus the UE remains registered for disaster roaming service which is not desirable.

Before disaster roaming feature this was fine, because the UE is registered with the PLMN P1 which is not a priority PLMN, but P1 is providing normal services to the UE. Now if the UE finds another PLMN P2 if this is also not a priority PLMN configured in the UE, then there is no point for the UE to switch from P1 to P2 aborting the current services UE is already receiving from the P1. Thus, the UE would neither search or select a random PLMN during the higher priority PLMN search procedure.

Consider illustration-1, let us say
  a) the UPLMN list is configured with UP-1, UP-2 (in priority order)
  b) OPLMN list is configured with: OP-1, OP-2 (in priority order).
  c) Random PLMNs available in the area: RP-1, RP-2 (not configured as priority PLMN in the UE)
  d) Forbidden PLMNs: FP-1, FP-2.

If the UE is registered on RP-1, the UE keep scanning, searching for OP-1, OP-2, UP-1, UP-2 periodically whenever it finds any of this higher priority PLMNs then current registered PLMN(RP-1), UE will select and register on them. But if UE is registered for RP-1 then it will not switch to RP-2 and vice versa because those are not higher priority PLMNs of the UE and there is no priority between them.

Further in prior art if the UE is registered with FP-1 or FP2, the UE will continue the scan/search/select procedure as per legacy procedure and skip Random PLMNs as described above because those are not the priority PLMNs for the UE.

Another illustration-2 is:
  a) UPLMN list configuration is empty.
  b) OPLMN list configuration is empty.
  c) Random PLMNs available in the area: RP-1, RP-2 (not configured as priority PLMN in the UE).
  d) Forbidden PLMNs: FP-1, FP-2.

Then as per prior art if the UE is registered with RP-1 it will not trigger any scan or search procedure or PLMN selection procedure because there is no higher priority PLMN configured in the UE. The UE remain registered with RP-1. Similarly if the UE is registered with FP-1 the UE will not trigger any periodic search/scan/selection procedure as there is no higher priority PLMN configured in the UE.

As illustrated above, the UE will remain registered with forbidden PLMN and continue to receive the disaster roaming service and will not switch to normal services (the services) quickly in this embodiment. Thus, it is desired to address the abovementioned disadvantages or other shortcomings or at least provide a useful alternative.

Embodiments herein disclose a higher priority PLMN selection method during a disaster situation in a wireless network. The method includes detecting, by a mobile station (MS) in the wireless network, whether the MS is registered for a disaster roaming service. In an embodiment, when the MS is registered for the disaster roaming service, the method includes selecting a higher priority PLMN in a priority order when the higher priority PLMN is available in the wireless network, other non-forbidden PLMN when the higher priority PLMN is unavailable in the wireless network, and registering the MS to receive the service in the wireless network on one of the selected higher priority PLMN, and the selected other non-forbidden PLMN. In another embodiment, when the MS is not registered for the disaster roaming service, the method includes selecting a higher priority PLMN in a priority order when the higher priority PLMN is available in the wireless network, and registering the MS on the selected higher priority PLMN to receive the service (e.g. normal service) in the wireless network.

The method can be used to search for allowable PLMN in an area, so as to avoid heavy loss to HPLMN and getting all the services to the UE.

When the UE is registered for the disaster roaming service, the UE is actually registered for forbidden PLMN, thus it is important that the UE continues search for any allowable PLMN in the area which provide normal services to the UE, irrespective of whether it is configured or not configured in the HPLMN/UPLMN/OPLMN lists.

Abbreviations used in the patent description are as follows:
a) VPLMN—Visited PLMN
b) Allowable PLMN—In the case of an MS operating in MS operation mode A or B, this is a PLMN which is not in the list of "forbidden PLMNs" in the MS. In the case of an MS operating in MS operation mode C or an MS not supporting A/Gb mode and not supporting Iu mode, this is a PLMN which is not in the list of "forbidden PLMNs" and not in the list of "forbidden PLMNs for GPRS service" in the MS.
c) Camped on a cell—The MS (ME if there is no SIM) has completed the cell selection/reselection process and has chosen a cell from which it plans to receive all available services. Note that the services may be limited, and that the PLMN or the SNPN may not be aware of the existence of the MS (ME) within the chosen cell.
d) EHPLMN—Any of the PLMN entries contained in the Equivalent HPLMN list.
e) Equivalent HPLMN list—To allow provision for multiple HPLMN codes, PLMN codes that are present within this list shall replace the HPLMN code derived from the IMSI for PLMN selection purposes. This list is stored on the USIM and is known as the EHPLMN list. The EHPLMN list may also contain the HPLMN code derived from the IMSI. If the HPLMN code derived from the IMSI is not present in the EHPLMN list then it shall be treated as a Visited PLMN (VPLMN) for PLMN selection purposes.
f) Home PLMN—This is a PLMN where the MCC and MNC of the PLMN identity match the MCC and MNC of the IMSI.
g) Registered PLMN (RPLMN)—This is the PLMN on which certain LR outcomes have occurred. In a shared network the RPLMN is the PLMN defined by the PLMN identity of the CN operator that has accepted the LR.
h) Registration—This is the process of camping on a cell of the PLMN or the SNPN and doing any necessary LRs.
i) UPLMN—PLMN/access technology combination in the "User Controlled PLMN Selector with Access Technology" data file in the SIM (in priority order);
j) OPLMN—PLMN/access technology combination in the "Operator Controlled PLMN Selector with Access Technology" data file in the SIM (in priority order) or stored in the ME (in priority order).

Disaster Condition: This is the condition that a government decides when to initiate and terminate, e.g. a natural disaster. When this condition applies, users may have the opportunity to mitigate service interruptions and failures.

Disaster Inbound Roamer: A user that (a) cannot get service from the PLMN it would normally be served by, due to failure of service during a Disaster Condition, and (b) is able to register with other PLMNs.

Disaster Roaming: This is the special roaming policy that applies during a Disaster Condition.

PLMN with Disaster Condition: A PLMN to which a Disaster Condition applies.

The terms disaster based service, disaster roaming service and disaster inbound roaming are used interchangeably in this embodiment and have the same meaning.

If the UE is in a Visited PLMN (VPLMN), the UE shall periodically attempt to obtain service on its HPLMN (if the EHPLMN list is not present or is empty) or one of its EHPLMNs (if the EHPLMN list is present) or a higher priority PLMN/access technology combinations listed in "user controlled PLMN selector" or "operator controlled PLMN selector" by scanning in accordance with the below order
1. The UE selects and attempts registration on other PLMN/access technology combinations, if available and allowable, in the following order
   i. either the HPLMN (if the EHPLMN list is not present or is empty) or the highest priority EHPLMN that is available (if the EHPLMN list is present);
   ii. each PLMN/access technology combination in the "User Controlled PLMN Selector with Access Technology" (UPLMN) data file in the SIM (in priority order);
   iii. each PLMN/access technology combination in the "Operator Controlled PLMN Selector with Access Technology" (OPLMN) data file in the SIM (in priority order) or stored in the ME (in priority order);

When the UE is registered for Disaster Roaming services and there are one or more random PLMN(s) which are available and allowable and not a part of any of the HPLMN/EHPLMN/UPLMN/OPLMN (as listed above in i, ii and iii above), the UE will not attempt to obtain service on such one or more random PLMN(s) as per conventional methods and systems.

Thus, the method is required and being proposed for the UE, when registered for Disaster Roaming service, to periodically scan and attempt to obtain service on any random PLMN(s) which is available and allowable and not a part of any of the HPLMN/EHPLMN/UPLMN/OPLMN and it is not defined currently as per conventional methods and systems.

For example, the UEs configuration is
a) RPLMN—R1
b) UPLMN list—U1, U2, U3
c) OPLMN list—Op1, Op2, Op3.
d) FPLMN list—FP1, FP2, FP3.

Higher priority PLMN selection timer "T" expires, the UE performs higher priority PLMN search(i.e. does a scan), the UE finds X1, X2 in the area which are not forbidden PLMNs i.e. those are Random PLMNs not configured in UPLMN list or OPLMN list of the UE and neither those are part of FPLMN lists.

The proposed method is used to perform higher priority Public Land Mobile Network (PLMN) Selection during disaster situation. The method is proposed for a User Equipment (UE), when registered for Disaster Roaming service to periodically scan and attempt to obtain service on any random PLMN(s) which is available and allowable and not a part of any of the Home Public Land Mobile Network (HPLMN)/Equivalent HPMLN (EHPLMN)/User Controlled PLMN (UPLMN)/Operator Controller (OPLMN)

Figure 2:
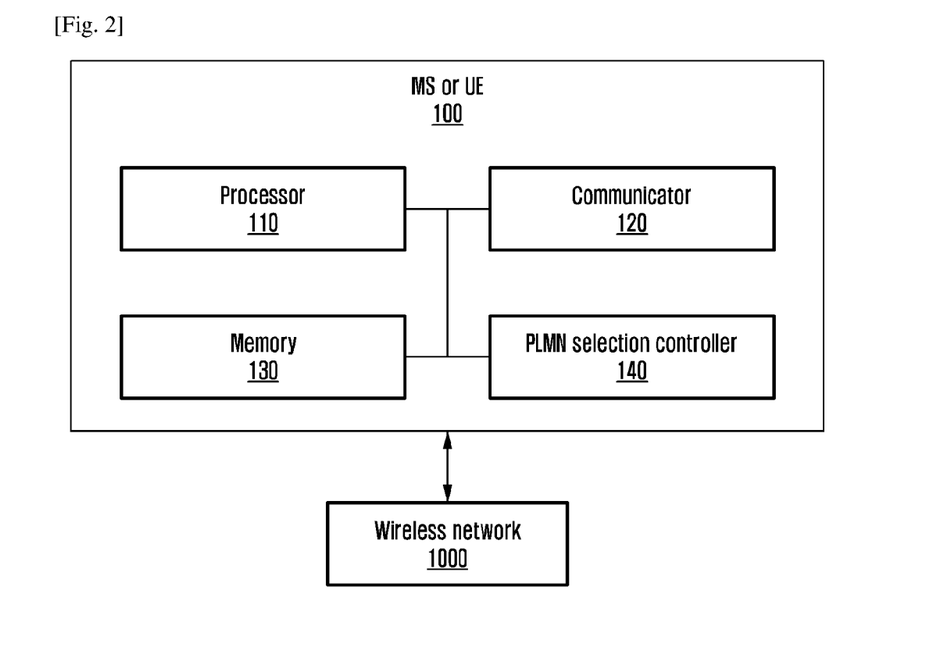
FIG. 2 shows various hardware components of the MS (or UE), according to the embodiments as disclosed herein.
Figure 3:
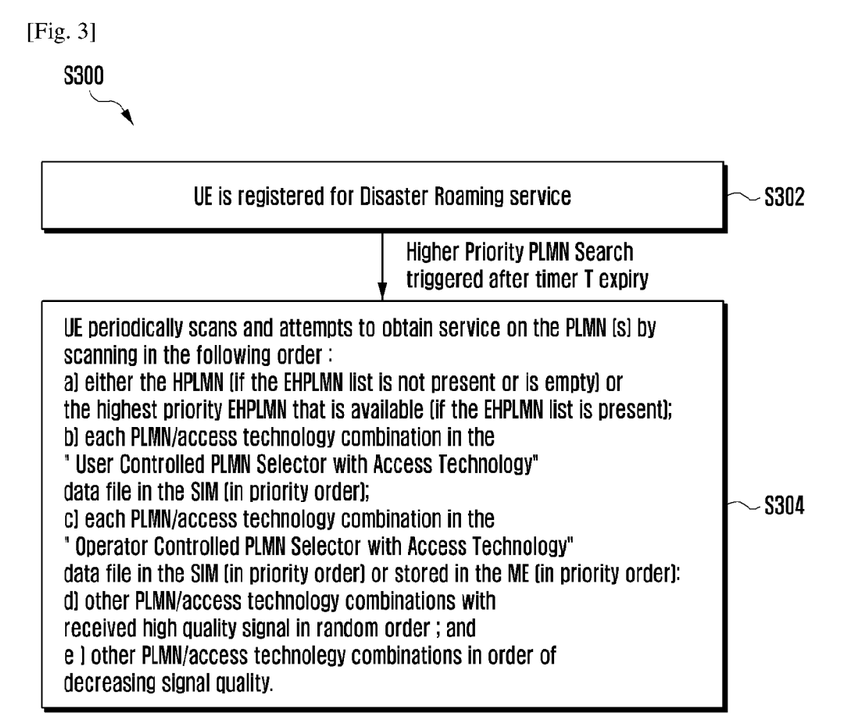
FIG. 3 is a flow chart illustrating an example scenario of PLMN(s) which the UE scan and obtain service when the UE is registered for the disaster roaming service, according to the embodiments as disclosed herein.
Figure 4:
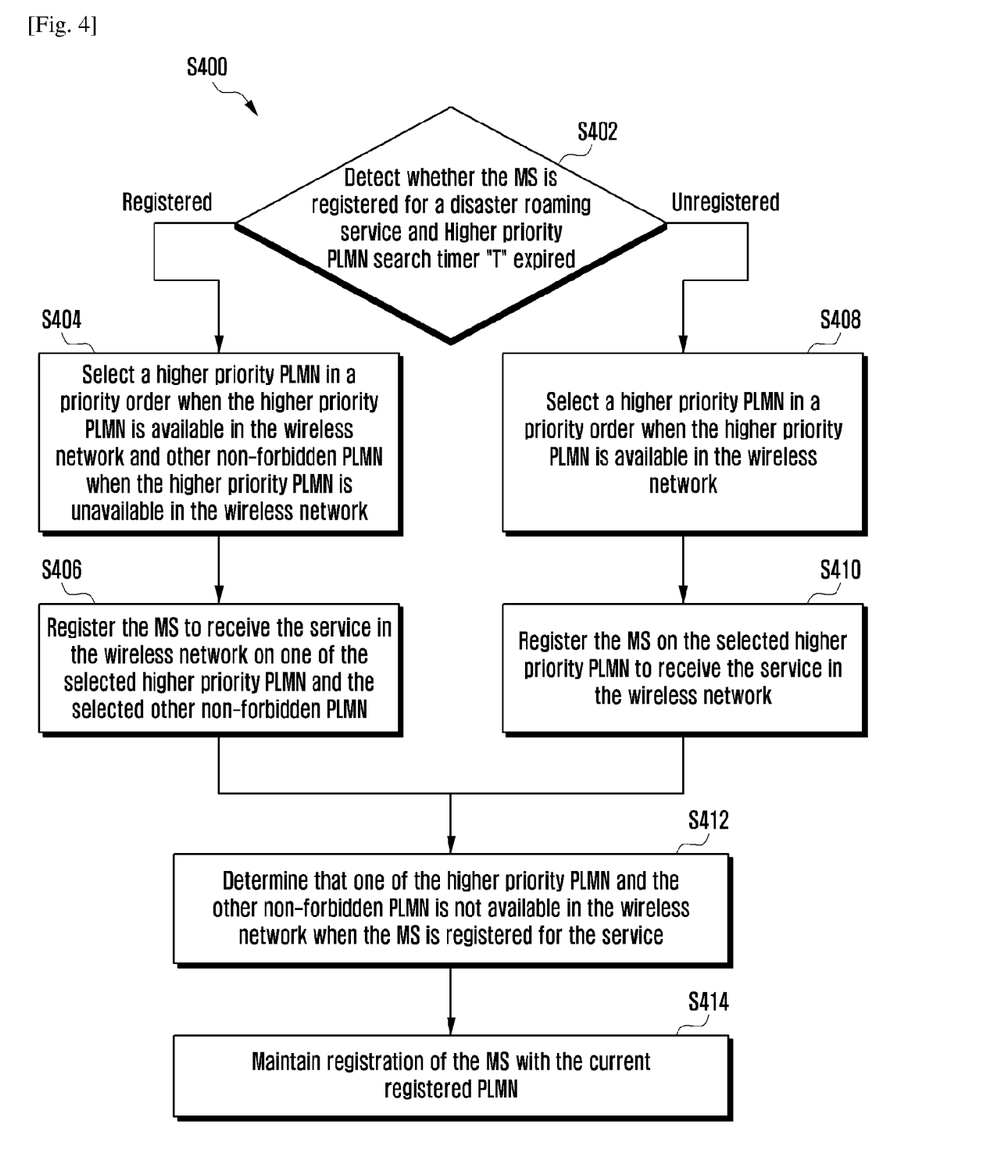
FIG. 4 is a flow chart illustrating a higher priority PLMN selection method during the disaster situation in the wireless network, according to the embodiments as disclosed herein.

Referring now to the drawings and more particularly to FIGS. 2 through 4, where similar reference characters denote corresponding features consistently throughout the figures, there are shown preferred embodiments.

FIG. 2 shows various hardware components of the MS (or UE) (100), according to the embodiments as disclosed herein. The MS (or UE) (100) can be, for example, but not limited to a cellular phone, a smart phone, a Personal Digital Assistant (PDA), a tablet computer, a laptop computer, an Internet of Things (IoT), embedded systems, edge devices, a vehicle to everything (V2X) device or the like. In an embodiment, the MS (or UE) (100) includes a processor (110), a communicator (120), a memory (130) and a PLMN selection controller (140). The processor (110) is coupled with the communicator (120), the memory (130) and the PLMN selection controller (140).

The PLMN selection controller (140) detects that the MS (100) is registered for the disaster roaming service. In an embodiment, when the MS (100) is registered for the disaster roaming service, the PLMN selection controller (140) selects one of a higher priority PLMN in a priority order when the higher priority PLMN is available in the wireless network (1000) and other non-forbidden PLMN when the higher priority PLMN is unavailable in the wireless network (1000). The wireless network (1000) can be, for example, but not limited to, a fourth generation network, a fifth generation network, an open radio access network (ORAN) network or the like.

Further, the PLMN selection controller (140) registers the MS (100) to receive the service in the wireless network (1000) on one of the selected higher priority PLMN, and the selected other non-forbidden PLMN. In an embodiment, the higher priority PLMN in the priority order includes i) select one of a HPLMN when an EHPLMN list is not present or is empty, and a highest priority EHPLMN that is available when the EHPLMN list is present, ii) each PLMN/access technology combination in an "User Controlled PLMN Selector with Access Technology" data file in a SIM in the priority order, and iii) each PLMN/access technology combination in an "Operator Controlled PLMN Selector with Access Technology" data file in a SIM in the priority order or stored in a ME in the priority order. In an embodiment, the other non-forbidden PLMN includes i) other PLMN/access technology combinations with received high quality signal in a random order, and ii) other PLMN/access technology combinations in an order of decreasing signal quality.

One of the selected higher priority PLMN, and the selected other non-forbidden PLMN is of same country as that of current serving PLMN before registering on the one of the selected higher priority PLMN, and the selected other non-forbidden PLMN.

In another embodiment, when the MS (100) is not registered for the disaster roaming service, the PLMN selection controller (140) selects a higher priority PLMN in a priority order when the higher priority PLMN is available in the wireless network (1000) and registers the MS (100) on the selected higher priority PLMN to receive the service in the wireless network (1000).

When the MS (100) is registered for the disaster roaming service on the forbidden PLMN, the PLMN selection controller (140) initiates a predefined timer T based on a timer value stored in a SIM or ME of the MS (100). Further, the PLMN selection controller (140) determines whether a predefined timer is expired and periodically attempts to obtain the service on the allowable PLMN when the predefined timer T is expired by triggering the higher priority PLMN selection method.

In an embodiment, the PLMN selection controller (140) scans for a plurality of PLMNs in the wireless network (1000) when the predefined timer is expired. Further, the PLMN selection controller (140) determines whether one of at least one higher priority PLMN and at least one other non-forbidden PLMN is available in the plurality of PLMNs based on the scanning. When the at least one higher priority PLMN is available in the plurality of PLMNs based on the scanning, the PLMN selection controller (140) selects the higher priority PLMN from the at least one higher priority PLMN in the plurality of PLMNs in the priority order, and registers the MS (100) on the selected higher priority PLMN to receive the service. Alternatively, when the at least one other non-forbidden PLMN is available in the plurality of PLMNs based on the scanning, the PLMN selection controller (140) selects the other non-forbidden PLMN from the at least one other non-forbidden PLMN in the plurality of PLMNs in the priority order, and registers the MS (100) on the selected PLMN to receive the service.

Further, the PLMN selection controller (140) determines that one of the higher priority PLMN and the other non-forbidden PLMN is not available in the wireless network (1000) when the MS (100) is registered for the disaster roaming service. Further, the PLMN selection controller (140) maintains registration of the MS (100) with the current registered PLMN.

The PLMN selection controller (140) is implemented by analog and/or digital circuits such as logic gates, integrated circuits, microprocessors, microcontrollers, memory circuits, passive electronic components, active electronic components, optical components, hardwired circuits and the like, and may optionally be driven by firmware.

Further, the processor (110) is configured to execute instructions stored in the memory (130) and to perform various processes. The communicator (120) is configured for communicating internally between internal hardware components and with external devices via one or more networks. The memory (130) also stores instructions to be executed by the processor (110). The memory (130) may include non-volatile storage elements. Examples of such non-volatile storage elements may include magnetic hard discs, optical discs, floppy discs, flash memories, or forms of electrically programmable memories (EPROM) or electrically erasable and programmable (EEPROM) memories. In addition, the memory (130) may, in some examples, be considered a non-transitory storage medium. The term "non-transitory" may indicate that the storage medium is not embodied in a carrier wave or a propagated signal. However, the term "non-transitory" should not be interpreted that the memory (130) is non-movable. In certain examples, a non-transitory storage medium may store data that can, over time, change (e.g., in Random Access Memory (RAM) or cache).

Although the FIG. 2 shows various hardware components of the MS (or UE) (100) but it is to be understood that other embodiments are not limited thereon. In other embodiments, the MS (or UE) (100) may include less or more number of components. Further, the labels or names of the components are used only for illustrative purpose and does not limit the scope of the embodiment. One or more components can be combined together to perform same or substantially similar function in the MS (or UE) (100).

FIG. 3 is a flow chart (S300) illustrating scenario of PLMN(s) which the UE (100) scan and obtain the service when the UE (100) is registered for disaster roaming service and the higher priority PLMN search timer (the timer T) expires, according to the embodiments as disclosed herein.

Unlike the conventional methods and systems, referring to the FIG. 3 considering the proposed method, if the UE (100) is in the Visited PLMN (VPLMN) and not registered for disaster roaming services, the UE (100) shall periodically attempt to obtain service on its HPLMN (if the EHPLMN list is not present or is empty) or one of its EHPLMNs (if the EHPLMN list is present) or a higher priority PLMN/access technology combinations listed in "user controlled PLMN selector" or "operator controlled PLMN selector" by scanning in accordance with the below order 1. The UE (100) selects and attempts registration on other PLMN/access technology combinations, if available and allowable, in the following order:
   a. either the HPLMN (if the EHPLMN list is not present or is empty) or the highest priority EHPLMN that is available (if the EHPLMN list is present);
   b. each PLMN/access technology combination in the "User Controlled PLMN Selector with Access Technology" (UPLMN) data file in the SIM (in priority order);
   c. each PLMN/access technology combination in the "Operator Controlled PLMN Selector with Access Technology" (OPLMN) data file in the SIM (in priority order) or stored in the ME (in priority order);

If the UE (100) is in the Visited PLMN (VPLMN) and registered for disaster roaming services, the UE (100) shall periodically attempt to obtain service on its HPLMN (if the EHPLMN list is not present or is empty) or one of its EHPLMNs (if the EHPLMN list is present) or a higher priority PLMN/access technology combinations listed in "user controlled PLMN selector" or "operator controlled PLMN selector" or any available and allowable PLMN(s) with received high quality signal in random order or any available and allowable PLMN(s) in order of decreasing signal quality by scanning in accordance with the below order-.

The UE (100) is registered for the Disaster Roaming service. The UE (100) selects and attempts registration on other PLMN/access technology combinations, if available and allowable, in the following order:
   a. either the HPLMN (if the EHPLMN list is not present or is empty) or the highest priority EHPLMN that is available (if the EHPLMN list is present);
   b. each PLMN/access technology combination in the "User Controlled PLMN Selector with Access Technology" (UPLMN) data file in the SIM (in priority order);
   c. each PLMN/access technology combination in the "Operator Controlled PLMN Selector with Access Technology" (OPLMN) data file in the SIM (in priority order) or stored in the ME (in priority order);
   d. other PLMN/access technology combinations with received high quality signal in random order;
   e. other PLMN/access technology combinations in order of decreasing signal quality.

Unlike the conventional methods and systems, the proposed method provides the PLMN(s) which the UE (100) scan and obtain service when the UE (100) is registered for Disaster Roaming Service. The steps are as follows (as shown in FIG. 3), At S302, the UE (100) is registered for the disaster roaming service.

At S304, the UE (100) periodically scans and attempts to obtain service on the PLMN(s) by scanning in the following order:
   a. either the HPLMN (if the EHPLMN list is not present or is empty) or the highest priority EHPLMN that is available (if the EHPLMN list is present);
   b. each PLMN/access technology combination in the "User Controlled PLMN Selector with Access Technology" data file in the SIM (in priority order);
   c. each PLMN/access technology combination in the "Operator Controlled PLMN Selector with Access Technology" data file in the SIM (in priority order) or stored in the ME (in priority order);
   d. other PLMN/access technology combinations with received high quality signal in random order;
   e. other PLMN/access technology combinations in order of decreasing signal quality.

The term Higher Priority PLMN Search is also commonly called as background PLMN search or timer with value T thus it's also called as timer T or it's called as timer T expiry action, "the MS shall periodically attempt to obtain service on its higher priority PLMN/access technology".

For example, the UEs configuration is
1. RPLMN—R1
2. UPLMN list—U1, U2, U3
3. OPLMN list—Op1, Op2, Op3.
4. FPLMN list—FP1, FP2, FP3.

Higher priority PLMN selection timer "T" expires, the UE (100) performs higher priority PLMN search (i.e. does a scan), the UE (100) finds X1, X2 in the area which are not forbidden PLMNs and does not find any other PLMN which is configured in the UE (100) as per above list, the UE (100) considers X1, X2 as candidate PLMNs for selection and registration, the UE (100) selects one of the X1, X2 performs registration procedure to receive normal services(also called as the services in this embodiment). The priority order among X1, X2 can be based on signal strength or random order. If the UE (100) finds higher priority PLMN like Op1 or U1 based on the configured priority UE will select the highest priority PLMN available and register on that to receive the normal services. If X1, X2 or any other higher priority PLMN is not available UE continues to remain registered with RPLMN (R1 which is actually a forbidden PLMN of the UE (100)).

In another example, the UE configuration is
1. The UE (100) is registered with FP1 (forbidden PLMN) to receive disaster roaming service.
2. UPLMN list is empty
3. OPLMN list is empty.

4. FPLMN list—FP1, FP2, FP3.
5. Random PLMNs—X1, X2 available in the area.
6. As per proposed embodiment, when the Higher priority PLMN selection timer "T" expires, the UE (100) performs higher priority PLMN search (i.e. does a scan/search), the UE (100) finds X1, X2 in the area which are not forbidden PLMNs and does not find any other PLMN which is configured in the UE (100) as per above list, the UE (100) considers X1, X2 as candidate PLMNs for selection and registration to receive the services. If no other PLMNs are available in the area then UE continue to remain registered with FP1 i.e. forbidden PLMN to continue to receive disaster roaming service to the UE.

FIG. 4 is a flow chart (8400) illustrating the higher priority PLMN selection method during the disaster situation in the wireless network (1000), according to the embodiments as disclosed herein. The operations (S402-8414) may be handled by the PLMN selection controller (140).

At 8402, the method includes detecting whether the MS (100) is registered for the disaster roaming service and the higher priority PLMN search timer "T" is expired. In response to determining that the MS (100) is registered for the disaster roaming service then, at S404, the method includes selecting the higher priority PLMN in the priority order when the higher priority PLMN is available in the wireless network (1000) and other non-forbidden PLMN when the higher priority PLMN is unavailable in the wireless network (1000). At 8406, the method includes registering the MS (100) to receive the service in the wireless network (1000) on one of the selected higher priority PLMN and the selected other non-forbidden PLMN.

In response to determining that the MS (100) is not registered for the disaster roaming service then, at S408, the method includes selecting the higher priority PLMN in the priority order when the higher priority PLMN is available in the wireless network (1000). At 8410, the method includes registering the MS (100) on the selected higher priority PLMN to receive the service in the wireless network (1000).

At S412, the method includes determining that one of the higher priority PLMN and the other non-forbidden PLMN is not available in the wireless network (1000) when the MS (100) is registered for the disaster roaming service. At 8414, the method includes maintaining registration of the MS (100) with the current registered PLMN.

The method can be used to search for allowable PLMN in an area, so as to avoiding heavy loss to HPLMN and getting all the services to the UE (100).

When the UE (100) is registered for the disaster roaming service, the UE (100) is actually registered for forbidden PLMN, thus it is important that the UE (100) continues search for any allowable PLMN in the area which provide normal services to the UE (100), irrespective of whether it is configured or not configured in the HPLMN/UPLMN/OPLMN lists.

The various actions, acts, blocks, steps, or the like in the flow charts (S300 and S400) may be performed in the order presented, in a different order or simultaneously. Further, in some embodiments, some of the actions, acts, blocks, steps, or the like may be omitted, added, modified, skipped, or the like without departing from the scope of the embodiment.

Figure 5:
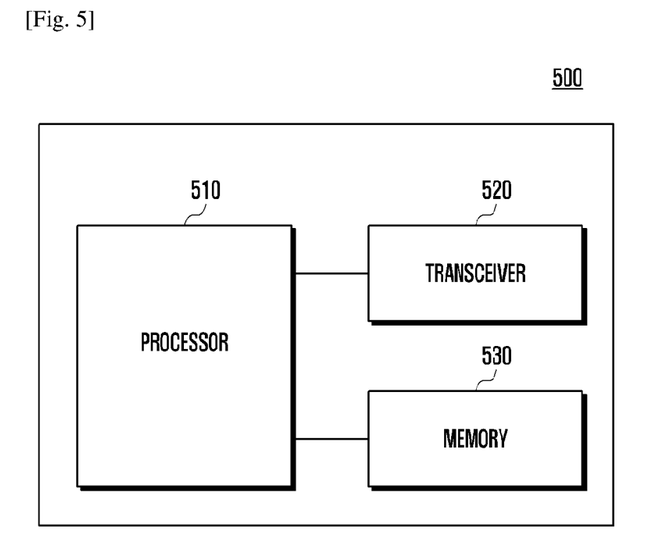
FIG. 5 illustrates an electronic device according to embodiments as disclosed herein.

FIG. 5 illustrates an electronic device according to embodiments as disclosed herein.

Referring to the FIG. 5, the electronic device 500 may include a processor 510, a transceiver 520 and a memory 530. However, all of the illustrated components are not essential. The electronic device 500 may be implemented by more or less components than those illustrated in FIG. 5. In addition, the processor 510 and the transceiver 520 and the memory 530 may be implemented as a single chip according to another embodiment.

The electronic device 500 may correspond to device described above. For example, the electronic device 500 may correspond to the MS 100 and/or wireless network 1000 illustrated in FIG. 2.

The aforementioned components will now be described in detail.

The processor 510 may include one or more processors or other processing devices that control the proposed function, process, and/or method. Operation of the electronic device 500 may be implemented by the processor 510.

The transceiver 520 may include a RF transmitter for up-converting and amplifying a transmitted signal, and a RF receiver for down-converting a frequency of a received signal. However, according to another embodiment, the transceiver 520 may be implemented by more or less components than those illustrated in components.

The transceiver 520 may be connected to the processor 510 and transmit and/or receive a signal. The signal may include control information and data. In addition, the transceiver 520 may receive the signal through a wireless channel and output the signal to the processor 510. The transceiver 520 may transmit a signal output from the processor 510 through the wireless channel.

The memory 530 may store the control information or the data included in a signal obtained by the electronic device 500. The memory 530 may be connected to the processor 510 and store at least one instruction or a protocol or a parameter for the proposed function, process, and/or method. The memory 530 may include read-only memory (ROM) and/or random access memory (RAM) and/or hard disk and/or CDROM and/or DVD and/or other storage devices.

According to an embodiment, a higher priority PLMN selection method during disaster situation in a wireless network (1000) may be provided.

According to the embodiment, the method may include detecting, by a mobile station (MS) (100) in the wireless network (1000), whether the MS (100) is registered for a disaster roaming service.

According to the embodiment, the method may include performing, by the MS (100), one of: when the MS (100) is registered for the disaster roaming service, selecting one of a higher priority PLMN in a priority order when the higher priority PLMN is available in the wireless network (1000), and other non-forbidden PLMN when the higher priority PLMN is unavailable in the wireless network (1000), and registering the MS (100) to receive the service in the wireless network (1000) on one of the selected higher priority PLMN, and the selected other non-forbidden PLMN, and when the MS (100) is not registered for the disaster roaming service, selecting a higher priority PLMN in a priority order when the higher priority PLMN is available in the wireless network (1000), and registering the MS (100) on the selected higher priority PLMN to receive the service in the wireless network (1000).

According to the embodiment, wherein the higher priority PLMN in the priority order may include: i) select one of a HPLMN when an EHPLMN list is not present or is empty, and a highest priority EHPLMN that is available when the EHPLMN list is present; ii) each PLMN/access technology combination in an "User Controlled PLMN Selector with Access Technology" data file in a SIM in the priority order;

and iii) each PLMN/access technology combination in an "Operator Controlled PLMN Selector with Access Technology" data file in a SIM in the priority order or stored in a ME in the priority order.

According to the embodiment, wherein the other non-forbidden PLMN may include: i) other PLMN/access technology combinations with received high quality signal in a random order; and ii) other PLMN/access technology combinations in an order of decreasing signal quality.

According to the embodiment, wherein, when the MS (100) is registered for the disaster roaming service on the forbidden PLMN, the method may include: initiating, by the MS (100), a predefined timer T based on a timer value stored in a SIM or ME of the MS (100); determining, by the MS (100), whether a predefined timer is expired; and periodically attempt, by the MS (100), to obtain the service on the allowable PLMN when the predefined timer T is expired by triggering the higher priority PLMN selection method.

According to the embodiment, wherein periodically attempt, by the MS (100), to obtain the service on the allowable PLMN may include: scanning, by the MS (100), for a plurality of PLMNs in the wireless network (1000) when the predefined timer is expired; determining, by the MS (100), whether one of at least one higher priority PLMN and at least one other non-forbidden PLMN is available in the plurality of PLMNs based on the scanning; and performing, by the MS (100), one of: when the at least one higher priority PLMN is available in the plurality of PLMNs based on the scanning, selecting the higher priority PLMN from the at least one higher priority PLMN in the plurality of PLMNs in the priority order, and registering the MS (100) on the selected higher priority PLMN to receive the service, and when the at least one other non-forbidden PLMN is available in the plurality of PLMNs based on the scanning, selecting the other non-forbidden PLMN from the at least one other non-forbidden PLMN in the plurality of PLMNs in the priority order, and registering the MS (100) on the selected PLMN to receive the service.

The method as claimed in claim 1, wherein one of the selected higher priority PLMN, and the selected other non-forbidden PLMN is of same country as that of current serving PLMN before registering on the one of the selected higher priority PLMN, and the selected other non-forbidden PLMN.

According to the embodiment, wherein the method may include determining, by the MS (100), that one of the higher priority PLMN and the other non-forbidden PLMN is not available in the wireless network (1000) when the MS (100) is registered for the disaster roaming service.

According to the embodiment, the method may include maintaining, by the MS (100), registration of the MS (100) with the current registered PLMN.

According to the embodiment, a MS (100) for PLMN selection during disaster situation in a wireless network (1000) may be provide.

According to the embodiment, the MS (100) may include: a memory (130); a processor (110); and a PLMN selection controller (140), communicatively coupled to the memory (130) and the processor (110).

According to the embodiment, the PLMN selection controller (140) may be configured to detect that the mobile station (MS) (100) is registered for a disaster roaming service.

According to the embodiment, the PLMN selection controller (140) may be configured to perform one of: when the MS (100) is registered for the disaster roaming service, selecting one of a higher priority PLMN in a priority order when the higher priority PLMN is available in the wireless network (1000), other non-forbidden PLMN when the higher priority PLMN is unavailable in the wireless network (1000), and registering the MS (100) to receive the service in the wireless network (1000) on one of the selected higher priority PLMN, and the selected other non-forbidden PLMN, and when the MS (100) is not registered for the disaster roaming service, selecting a higher priority PLMN in a priority order when the higher priority PLMN is available in the wireless network (1000), and registering the MS (100) on the selected higher priority PLMN to receive the service in the wireless network (1000).

According to the embodiment, wherein the higher priority PLMN in the priority order may include: i) select one of a HPLMN when an EHPLMN list is not present or is empty, and a highest priority EHPLMN that is available when the EHPLMN list is present; ii) each PLMN/access technology combination in an "User Controlled PLMN Selector with Access Technology" data file in a SIM in the priority order; and iii) each PLMN/access technology combination in an "Operator Controlled PLMN Selector with Access Technology" data file in a SIM in the priority order or stored in a ME in the priority order.

According to the embodiment, wherein the other non-forbidden PLMN may include: i) other PLMN/access technology combinations with received high quality signal in a random order; and ii) other PLMN/access technology combinations in an order of decreasing signal quality.

According to the embodiment, wherein, when the MS (100) is registered for the disaster roaming service on the forbidden PLMN, the PLMN selection controller (140) is configured to: initiate a predefined timer T based on a timer value stored in a SIM or ME of the MS (100); determine whether a predefined timer is expired; and periodically attempt to obtain the service on the allowable PLMN when the predefined timer T is expired by triggering the higher priority PLMN selection method.

According to the embodiment, wherein periodically attempt to obtain the service on the allowable PLMN may include: scan for a plurality of PLMNs in the wireless network (1000) when the predefined timer is expired; determine whether one of at least one higher priority PLMN and at least one other non-forbidden PLMN is available in the plurality of PLMNs based on the scanning; and perform one of: when the at least one higher priority PLMN is available in the plurality of PLMNs based on the scanning, select the higher priority PLMN from the at least one higher priority PLMN in the plurality of PLMNs in the priority order, and register the MS (100) on the selected higher priority PLMN to receive the service, and when the at least one other non-forbidden PLMN is available in the plurality of PLMNs based on the scanning, select the other non-forbidden PLMN from the at least one other non-forbidden PLMN in the plurality of PLMNs in the priority order, and register the MS (100) on the selected PLMN to receive the service.

According to the embodiment, wherein one of the selected higher priority PLMN, and the selected other non-forbidden PLMN is of same country as that of current serving PLMN before registering on the one of the selected higher priority PLMN, and the selected other non-forbidden PLMN.

According to the embodiment, wherein the PLMN selection controller (140) is configured to determine that one of the higher priority PLMN and the other non-forbidden PLMN is not available in the wireless network (1000) when the MS (100) is registered for the disaster roaming service.

According to the embodiment, wherein the PLMN selection controller (140) is configured to maintain registration of the MS (100) with the current registered PLMN.

The foregoing description of the specific embodiments will so fully reveal the general nature of the embodiments herein that others can, by applying current knowledge, readily modify and/or adapt for various applications such specific embodiments without departing from the generic concept, and, therefore, such adaptations and modifications should and are intended to be comprehended within the meaning and range of equivalents of the disclosed embodiments. It is to be understood that the phraseology or terminology employed herein is for the purpose of description and not of limitation. Therefore, while the embodiments herein have been described in terms of preferred embodiments, those skilled in the art will recognize that the embodiments herein can be practiced with modification within the scope of the embodiments as described herein.

The invention claimed is:

1. A method performed by a mobile station (MS) in a communication system, the method comprising:
    identifying whether the MS is registered for a disaster roaming service;
    in case that the MS is registered for the disaster roaming service, periodically attempting to obtain service on a first public land mobile network (PLMN), based on following order:
        i) either a home PLMN (HPLMN), in case that an equivalent HPLMN (EHPLMN) list is not present or is empty, or a highest priority EHPLMN that is available in case that the EHPLMN list is present;
        ii) each PLMN/access technology combination in a user controlled PLMN selector with access technology data file in a subscriber identification module (SIM) in priority order;
        iii) each PLMN/access technology combination in an operator controlled PLMN selector with access technology data file in the SIM in priority order or stored in a mobile equipment (ME) in priority order;
        iv) PLMN/access technology combinations with received high quality signal in random order; and
        v) PLMN/access technology combinations in order of decreasing signal quality, and
    in case that the MS is not registered for the disaster roaming service and the MS is in a visited PLMN, periodically attempting to obtain service on a second PLMN based on following order:
        i) either the home PLMN, in case that the EHPLMN list is not present or is empty, or the highest priority EHPLMN that is available in case that the EHPLMN list is present;
        ii) each PLMN/access technology combination in the user controlled PLMN selector with access technology data file in the SIM in priority order; and
        iii) each PLMN/access technology combination in the operator controlled PLMN selector with access technology data file in the SIM in priority order or stored in the ME in priority order.

2. The method of claim 1, wherein, in case that the MS is registered for the disaster roaming service, attempting to obtain the service is performed periodically based on a value of a predefined timer T being stored in the SIM.

3. The method of claim 1, wherein each of the first PLMN and the second PLMN is a PLMN other than a registered PLMN.

4. A mobile station (MS) in a communication system, the MS comprising:
    a communicator; and
    a processor coupled with the communicator and configured to:
        identify whether the MS is registered for a disaster roaming service;
        in case that the MS is registered for the disaster roaming service, periodically attempt to obtain service on a first public land mobile network PLMN), based on following order:
            i) either a home PLMN (HPLMN), in case that an equivalent HPLMN (EHPLMN) list is not present or is empty, or a highest priority EHPLMN that is available in case that the EHPLMN list is present;
            ii) each PLMN/access technology combination in a user controlled PLMN selector with access technology data file in a subscriber identification module (SIM) in priority order;
            iii) each PLMN/access technology combination in an operator controlled PLMN selector with access technology data file in the SIM in priority order or stored in a mobile equipment (ME) in priority order;
            iv) PLMN/access technology combinations with received high quality signal in random order; and
            v) PLMN/access technology combinations in order of decreasing signal quality, and
        in case that the MS is not registered for the disaster roaming service and the MS is in a visited PLMN, periodically attempt to obtain service on a second PLMN, based on following order:
            i) either the home PLMN, in case that the EHPLMN list is not present or is empty, or the highest priority EHPLMN that is available in case that the EHPLMN list is present;
            ii) each PLMN/access technology combination in the user controlled PLMN selector with access technology data file in the SIM in priority order; and
            iii) each PLMN/access technology combination in the operator controlled PLMN selector with access technology data file in the SIM in priority order or stored in the ME in priority order.

5. The MS of claim 4, wherein, in case that the MS is registered for the disaster roaming service, attempting to obtain the service is performed periodically based on a value of a predefined timer T being stored in the SIM.

6. The MS of claim 4, wherein each of the first PLMN and the second PLMN is a PLMN other than a registered PLMN.

* * * * *